Patented Sept. 19, 1939

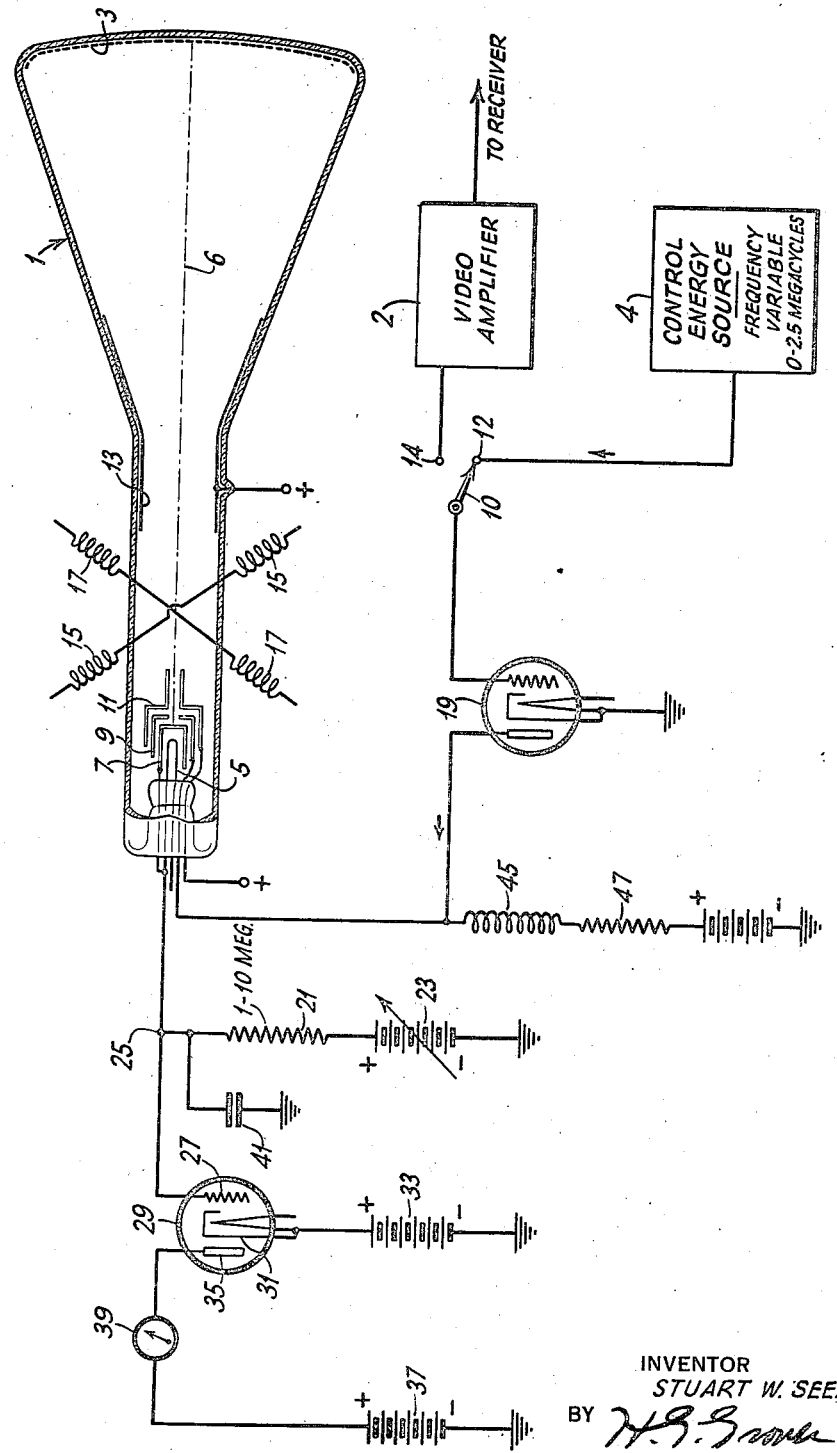

2,173,184

UNITED STATES PATENT OFFICE 2,173,184

MEASURING APPARATUS

Stuart W. Seeley, Bayside, N. Y., assignor to Radio Corporation of America, a corporation of Delaware Application July 31, 1937, Serial No. 156,632

4 Claims. (Cl. 171—95)

The present invention relates to electronic apparatus, and is particularly concerned with a device for measuring signal strength applied to control apparatus of this particular type. In its most specific form, the invention is broadly adapted to use with cathode ray apparatus such as is used, for example, in reproducing television images and for oscillograph observations.

With apparatus of this general nature, where it is desired to obtain some indications particularly of the signal strength which is available to control the beam modulation in a cathode ray image reproducing tube, it is not possible to utilize the well known vacuum tube voltmeters because of the fact that a substantial amount of capacity would be introduced into the load circuit serving to control the cathode ray tube if such devices of the prior art were included as a part of the complete set-up and used to measure the voltages applied to the control electrode of the cathode ray tube being used to produce the visible indications. Any such additional capacity would tend to limit the frequency range of the preceding amplifier tube. Further, the use of a vacuum tube voltmeter of well known characteristics with apparatus of this nature is undesirable because of the fact that in obtaining readings and measurements of the voltage applied to control electronic apparatus of this type, it is desirable that any observations made shall be observations which would represent, even in view of the testing, the actual voltages applied to control electronic apparatus of this type under actual operating conditions.

When well known vacuum tube voltmeters are used to determine voltages used to control electronic apparatus, it is customary to connect the vacuum tube voltmeter across the circuit of the control element, and it has been found that vacuum tube voltmeters of known types have capacities of the order of 2 to 3 micromicrofarads, and if a capacity of this size is connected across the control electrode of the cathode ray tube, in the usual manner of connecting a vacuum tube voltmeter, this effect would be to alter the characteristics of the preceding amplifier which is to apply the control signal to the cathode ray tube. Thus, there would be a false indication of the characteristics of frequency plotted against amplitude for the amplifier tube supplying the control signal. Thus, accurate measurements of the control voltage can not conveniently be obtained with existing types of vacuum tube voltmeters.

Accordingly, the present invention serves to provide, through the connection of a vacuum tube voltmeter in the cathode circuit of a cathode ray tube, a system and apparatus whereby an accurate and easily obtained measurement of the controlling voltage is obtained in accordance with the cathode current flowing. Further, the present invention provides an arrangement and system of measurement which will not alter the frequency and amplitude characteristics of the amplifier serving to control or modulate the cathode ray beam developed within the cathode ray tube and which, at the same time, will give an accurate indication of the potentials applied to the control electrode for modulating the developed cathode ray beam.

In its preferred form, the invention provides for applying signals, such as signals from a video amplifier actuated in accordance with conditions which would take place with the application of received television transmission signals to the control electrode or grid of a cathode ray tube, by way of a suitable amplifier whose output may be either connected with the cathode ray tube control electrode by way of the well known type of D. C. connection or by way of the well known A. C. connection. In place of connecting the vacuum tube voltmeter in this manner, there is provided in the cathode circuit of the cathode ray tube a resistance element of relative high value and a suitable source of biasing voltage whereby substantially zero value cathode current is obtained in the cathode ray tube. By connecting the input circuit of a second vacuum tube amplifier across this resistor and bias source, which is connected in series with the cathode lead of the cathode ray tube and about which all alternating frequency components are suitably by-passed, there may be obtained in accordance with the output current flowing in the vacuum tube amplifier a reading or indication of the potentials applied to the control electrode of the cathode ray tube which serve to vary the cathode current of the cathode ray tube to produce modulation of the light released by the luminescent screen.

Accordingly, it is one of the objects of this invention to provide a system and means by which it is possible to measure in a relatively simple manner the potentials or control signals applied to the control electrode of a cathode ray tube for the purpose of modulating or varying the intensity of the cathode ray beam which is developed therein and by which suitable electro-optical image representations are produced upon the luminescent screen of the tube.

A further object of the invention is to provide a system and means by which control potentials applied to cathode ray apparatus and the like may be measured without affecting and disturbing the natural characteristics of the circuits and tubes serving to apply the controlling signals to the cathode ray tube.

A further object of the invention is to provide a system and means by which in test apparatus, for example, the applied voltages impressed upon electronic apparatus of the cathode ray tube may be measured under the same condition as would be obtained when the apparatus was in actual use to reproduce, for example, received television signals.

Further objects of the invention are to provide a system and means by which measurements of applied controlling signals on electronic apparatus may be obtained through the use of simple, inexpensive and efficiently operating measuring devices which are easily connected and rugged in operation in order that extremely sensitive meters and the like, which are at best expensive, need not be used.

Still further objects and advantages of the invention will become apparent and at once suggest themselves to those skilled in the art by reading the following specification and claims in connection with the accompanying drawing, wherein, the single figure thereof illustrates schematically one of the several forms which my invention may assume.

Referring now to the drawing, a cathode ray tube 1 upon which visible indications are to be produced on a luminescent screen 3 supported on the inner surface of the end of the tube wall is arranged to be actuated and controlled under the influence of signals received from a suitable source of transmission (not shown) through a video amplifier 2. Under conditions of testing the signals for control preferably originate from a suitable source of control energy 4 which may be provided locally. By adjusting the amplitude of the controlling energy source 4 to a constant value, and then varying the frequency of the source 4 over the desired range, for example, that corresponding to the modulation range of the signals to be received, the cathode ray tube may be controlled and the characteristics of the video amplifier to supply signals thereto may be measured. The source of energy 4 is illustrated only in schematic form but it may be any standard type oscillator capable of delivering output energy at different derived levels and over the desired frequency range.

In its preferred form, the cathode ray tube 1 comprises the usual electron gun structure 5 including a cathode 7, a control electrode 9 and a first anode 11 arranged according to well known manner. The cathode 7 may be either of the indirectly heated type shown or, where desired, of the directly heated type. Also, as a part of the cathode ray tube, it is usually desirable, for the purpose of accelerating and/or focussing the electron ray beam developed by the application of a suitable potential between the anode 11 and the cathode 7, to provide a second anode 13 arranged to operate at a positive potential relative to both the first anode 11 and the cathode 7. Under normal operating conditions, the second anode 13 is maintained at a potential positive with respect to the first anode 11 within the range varying between 3 to 1 and 10 to 1, for example.

In order to deflect the cathode ray beam 6 developed within the tube 1 so that it traverses the luminescent screen 3 according to a bi-direction pattern, suitable deflecting coils 15 and 17, which are conventionally shown, are provided. Although these coils for simplicity have not been indicated as connected to any desired source of deflecting current. It will be appreciated that the current flowing through these coils may be developed and provided in known manner, and reference to one suitable form of system for providing the deflecting currents and controlling the rate of sweep of the cathode ray beam across the luminescent screen has been shown in U. S. Patent to Tolson 1,993,378 of April 30, 1935, (Reissue #20,700, April 19, 1938) and reference is made to his patent, for example, for this portion of the invention.

According to the usual manner of connecting signal energy to control or modulate the cathode ray beam developed within the tube 1, signals as received on a television receiver of the general type described by Carlson Patent 1,975,056 of September 25, 1934, are applied to the input circuit of the video amplifier 19 whose output circuit is, as shown, directly connected with the control electrode 9 of the cathode ray tube so that amplified video signals such as are impressed upon the tube 19 are supplied to control the intensity of the cathode ray beam developed in the tube 1. The load circuit of the amplifier tube 19 includes an inductance 45, a resistance 47, and a source of potential, the source of potential being effective to maintain the anode of the amplifier tube 19 positive with respect to the cathode thereof. It will, of course, be appreciated that while the connection between the output of the amplifier 19 and the control electrode 9 of the cathode ray tube has been shown as being of the direct connected type, this obviously may be of the well known capacity coupled form without in any way departing from the spirit and scope of this invention.

Connected to the cathode element 7 of the gun structure 5 of the tube 1 is a resistor 21 preferably, although not necessarily, of a value between 1 and 10 megohms. In series with resistor 21 is a suitable source of bias voltage 23 poled to maintain the cathode 7 positive relative to the grid or control electrode 9. Connected to one terminal point 25 of the resistor is the control electrode 27 of an amplifying tube 29 whose cathode 31 is also biased positively relative to the control electrode 27 by a biasing source 33. In the output circuit of the tube 29, there is connected to the anode 35 which is supplied with operating potential from a source 37, a measuring meter 39 so that measurements of the anode current flowing through the tube 29 may be readily observed. In order to by-pass all alternating currents around the resistor 21 and the bias source 23, these elements are shunted, as shown, by suitable by-pass condenser 41, the value of which may vary for example within the range between 0.1 and 1.0 microfarads, the value, naturally, being determined in accordance with the size of the resistor element 21.

In order to operate the system above described and to determine the magnitude of the potentials serving to control the control electrode 9 and thus the characteristics of the amplifier 19 so that this amplifier may be caused to respond uniformly at all desired frequencies, the bias source 23 is preferably adjusted to such a value that the cathode 7 is maintained positive relative to the grid 9 and the beam current normally developed thin the tube 1 is substantially cut-off. If now alternating current potential is applied to the ...id 9, the negative peaks of such a potential ...use little or no change in the beam current ...reas the positive peaks allow considerable ...thode current to flow. The net effect results ...an increase in the D. C. component of the ...thode current flowing through resistor 21. ...e increased current flow through resistor 21 ...uses a change in the potential at point 25 ...ich is applied to the grid 27 thereby changing ...e plate current of tube 29 and producing a corresponding indication on the meter 39.

If, now, the switch 10 is against the lower contact 12 so that the control energy source 4 ...ariable in frequency over a range of zero cycles ...two and one-half megacycles, for example) ...connected to the input circuit to the exclusion ...the video signals from amplifier 2 which appear at terminal point 14 and then the frequency ...the control energy source 4 is changed automatically or manually, it will readily be appreciated that for optimum reception the gain in the ...be 19 should be constant for all frequencies ...d, consequently, no change in the indication ...oduced upon the meter 39 should result. However, if a change is noted on the meter 39 during ...e change of frequency within the range provided by the source 4, then the strength of the ...ntrol energy supplied from the source at the ...rticular frequency upon which a change in ...eter indication is noted may be varied until ...e meter 39 produces the same indication as ...r the previously tested frequency. This operation is preferably carried on and repeated ...roughout the frequency range of the control ...ergy source varying between the lowest frequency which is to be received and reproduced ...on the viewing screen 3 of the tube 1 up to the ...ghest frequency.

In accordance with variations in the strength the output of the control energy source which to energize the amplifier 19 at different frequencies and which would correspond to the video ...plifier 2 as the source in actual television operation (to the exclusion of source 4) the characteristic of the amplifier 19 over the entire ...nge of frequencies may readily be determined. it should be observed that the characteristic ...the tube 19, for example, varies in passing ...rough the range between the lowest and the ...ghest frequencies which are to be reproduced, ...en it is apparent that this characteristic and ...ck of uniformity in response at all frequencies ...ay be changed by adjusting the values of the ...ductance 45 and resistor 47 connected in the ...ad circuit of the tube 19 to some new value. ...hen values of the inductance and resistance in ...e load circuit of the tube 19 which provides ...nstant gain in the tube 19 for all frequencies ...thin the range to be supplied to the control ...ectrode 9 of the cathode ray tube 1 are determined, these values in inductance and resistance ...ay be permanently maintained as a part of the ...tput circuit of the tube 19 and a part of the ...ntrolling circuit for the cathode ray tube 1.

Various obvious modifications and alterations ...ay be made in the present invention without ...parting from the spirit and scope thereof, and ...is desired that any and all such modifications ...considered within the purview of the present ...vention except as limited by the hereinafter ...pended claims.

What I claim is:

1. A system for determining variances in uniformity of frequency response in wide band amplifiers controlling cathode ray apparatus comprising a source of energy of known magnitude variable in frequency throughout a range from a predetermined minimum to a predetermined maximum, an amplifier adapted to be energized from and to amplify the energy of said source, a cathode ray tube having at least a cathode, a control electrode, and an anode for developing an electron beam, means for connecting the control electrode thereof to the output of said amplifier, an indicating means, and means for connecting the indicating means to an electrode of the cathode ray tube so as to include the electron beam current path of the cathode ray tube to indicate the average value of the current flowing within the cathode ray tube in said path, and accordingly the average value of the control electrode potential.

2. A system for determining variances in uniformity of frequency response in wide band amplifiers controlling cathode ray apparatus comprising a source of electrical energy of known magnitude variable in frequency throughout a range from a predetermined minimum to a predetermined maximum, an amplifier connected to receive the energy from said source, a cathode ray tube having electron gun structure including a cathode, an anode and control electrode for developing an electron beam, means for electrically coupling said control electrode to the output energy from said amplifier, a resistor connected in the cathode circuit of said cathode ray tube, and means connected serially between said resistor and said control electrode for applying biasing potentials to the said control electrode for normally biasing the said cathode ray tube substantially to cut-off, and indicating means connected across the said resistor for indicating the thermionic current flowing in the cathode-anode circuit of said cathode ray tube during periods of application of control energy to the control electrode of said cathode ray apparatus.

3. The system claimed in claim 2 comprising, in addition, means for bypassing alternating current components about the indicating means.

4. A system for determining variances in uniformity of frequency response in wide band amplifiers controlling cathode ray apparatus comprising a source of electrical energy of known magnitude variable in frequency throughout a range from a predetermined minmum to a predetermined maximum, an amplifier connected to receive the energy from said source, a cathode ray tube having electron gun structure including a cathode, an anode and control electrode for developing an electron beam, said control electrode being connected for energization by the output energy from said amplifier, a resistor connected in the cathode circuit of said cathode ray tube, and means for applying biasing potentials for normally biasing the said cathode ray tube substantially to cut-off, and indicating means including an electronic device connected in parallel with said resistor for indicating the current flowing in the cathode-anode circuit of said cathode ray tube during periods of application of control energy to the control electrode of said cathode ray apparatus.

STUART W. SEELEY.